Patented June 12, 1945

2,378,195

UNITED STATES PATENT OFFICE 2,378,195

PREPARATION OF PARTIAL POLYMERS AND COPOLYMERS OF DIVINYL BENZENE

Gaetano F. D'Alelio, Pittsfield, Mass., assignor to General Electric Company, a corporation of New York No Drawing. Application June 23, 1942, Serial No. 448,155

3 Claims. (Cl. 260—86)

This invention relates to the preparation of synthetic resin compositions and more particularly to the preparation of heat-convertible, soluble, fusible polymers and copolymers of divinyl benzene.

It is known that polymerization of compounds possessing more than one terminal

grouping, providing the system is not conjugated, results in the formation of a cross-linked, insoluble, infusible polymer. Examples of such compounds are glycol dimethacrylate, diallyl succinate, diallyl phthalate, diallyl maleate, allyl acrylate, diallyl oxalate, dimethallyl ether, etc. Divinyl benzene, polymerized in the usual manner, acts in the same fashion. When this compound is polymerized, an insoluble, very hard, infusible, nonworkable mass is obtained.

I have now discovered that divinyl benzene may be partially polymerized to a soluble and fusible heat-convertible mass, thus making available for commercial use a product heretofore inapplicable. The process by which a soluble, fusible, partial polymer of divinyl benzene may be isolated comprises polymerizing a solution of divinyl benzene in a dialkyl benzene having at least two carbon atoms in each alkyl grouping, in the presence of both an inhibitor and a catalyst of polymerization for a time less than that required to cause separation of the polymer. The dissolved partial polymer is then precipitated by the addition of a non-solvent or by evaporation of the volatile constituents. Although the product is fusible and soluble, it has the unique property of possessing heat-convertibility and may, therefore, be converted to an infusible, insoluble material.

Present production of divinyl benzene (monomer) is carried out in such a manner that the resulting product is an inseparable mixture of about 20–30% divinyl benzene in diethyl benzene. The present invention is of special interest because it utilizes this inseparable mixture for which there has been no use up until the present time.

Extensive experiments carried out on the polymerization of divinyl benzene in a dialkyl benzene indicate that an insoluble, infusible resin is obtained as a gel when ordinary polymerization methods are employed. This gel formation or precipitation takes place in a very short time, e. g., 15–20 minutes. The extreme sensitivity of this resin precludes its use in industrial applications. By means of this invention, I may cause the polymer to be formed at a much slower rate, thus providing a greater permissible deviation from any calculated time required to give a maximum yield of partial polymer. The time required depends upon the type as well as the amount of inhibitor and catalyst present in the solution. I have found that, by varying my conditions, a partially polymerized product may be obtained in as little as 17 minutes and in excess of 12 hours.

This invention is not limited to preparing only partial polymers but includes the preparation of partial copolymers, e. g., partially copolymerized divinyl benzene and styrene, partially copolymerized divinyl benzene and ethyl acrylate, etc.

The actual polymerization of the divinyl benzene from its solution in a dialkyl benzene is carried out as previously indicated in the presence of both a catalyst and an inhibitor of polymerization. Any suitable method may be employed. However, I prefer to cause polymerization under the influence of external heat in the presence of an inhibitor and catalyst for a period substantially less than that required to cause gelation of the solution. For purposes of economy and convenience I prefer to use reflux temperature and atmospheric pressure although other elevated temperatures and pressures, ranging from subatmospheric to superatmospheric pressure, may be used. The partial polymer of divinyl benzene may be precipitated from the dialkyl benzene by the addition of some non-solvent, e. g., methyl alcohol, ethyl alcohol, glycol, etc.

For polymerization catalysts in the polymerization of divinyl benzene, I may use ozone, ozonides, inorganic super-oxides such as barium peroxide, sodium peroxide, etc., aliphatic acyl peroxides, e. g., acetyl peroxide, lauryl peroxide, stearyl peroxide, etc., peroxides of the aromatic acid series, e. g., benzoyl peroxide, etc., ketone peroxides, e. g., acetone peroxide, triacetone peroxide, alkyl derivatives of hydrogen peroxide, e. g., ethyl hydrogen peroxide, diethyl peroxide, etc., mixed organic peroxides, e. g., acetyl benzoyl peroxide, etc., various per compounds such as perborates, persulfates, perchlorates, etc., aluminum salts such as the halides, e. g., aluminum chloride, organic and inorganic acids such as methacrylic, hydrofluoric, etc., metal compounds of the unsaturated acids as, for instance, cobalt and manganese resinates, linoleates, maleates, etc., hydrogen peroxide, etc. Benzoyl peroxide is the preferred catalyst. Any suitable amount of catalyst may be used, but, in general, the catalyst concentration will be within the range of 0.1 to 2.0% by weight of divinyl benzene.

As inhibitors in the partial polymerization of divinyl benzene I may use compounds of the type

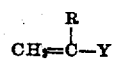

where R is a member of the class consisting of hydrogen and methyl, and Y is a member of the class consisting of —CR'₂OR', —CR'₂X, —CR'₂OCOR' and —CR'O radicals and R' is a member of the class consisting of hydrogen and alkyl and aryl radicals including those radicals in which one or more hydrogen atoms have been replaced by some substituent grouping, e. g., a halogen and where X is halogen, e. g., chlorine, bromine, iodine, etc. Illustrative examples of the radicals represented by R' in the above formulae are: methyl, ethyl, propyl, isopropyl, butyl, isobutyl, amyl, isoamyl, hexyl, phenyl, tolyl, xylyl, xenyl, naphthyl, methylnaphthyl, benzyl, phenethyl, cyclopentyl, methylcyclopentyl, cyclohexyl, methylcyclohexyl and their homologues as well as those in which one or more hydrogen atoms have been replaced by some substituent grouping, e. g., a halogen. Examples of such halogen substituted radicals are: chloroethyl, bromopropyl, fluorophenyl, iodotolyl, chlorocyclopentyl, dichloronaphthyl, etc.

Examples of inhibitors of the type expressed in the general formula defined above are: acrolein, alpha-methacrolein, allyl methyl ketone, allyl ethyl ketone, allyl propyl ketone, allyl isobutyl ketone, allyl chloride, allyl bromide, allyl iodide, methallyl chloride, methallyl iodide, methallyl bromide, alpha-methyl allyl chloride, alpha-ethyl allyl chloride, alpha, alpha-dimethyl allyl chloride, alpha, alpha, beta-trimethyl allyl bromide, alpha-methyl alpha-ethyl allyl chloride, alpha-butyl allyl chloride, alpha-cyclohexyl allyl chloride, alpha-phenyl allyl chloride, alpha-tolyl allyl bromide, alpha-benzyl beta-methyl allyl chloride, allyl alcohol, beta-methallyl alcohol, alpha-methallyl alcohol, alpha, beta-dimethyl allyl alcohol, alpha, beta, beta-trimethyl allyl alcohol, alpha-cyclohexyl allyl alcohol, alpha-phenyl allyl alcohol, alpha-tolyl allyl alcohol, alpha-phenyl beta-methallyl alcohol, alpha-naphthyl beta-methyl allyl alcohol, alpha-benzyl allyl alcohol, alpha-phenethyl allyl alcohol, allyl methyl ether, allyl ethyl ether, allyl propyl ether, ally phenyl ether, allyl benzyl ether, allyl phenethyl ether, allyl cyclohexyl ether, beta-methallyl methyl ether, beta-methallyl ethyl ether, alpha-methallyl tolyl ether, alpha-ethallyl chloroethyl ether, alpha-benzallyl propyl ether, alpha-phenethallyl benzyl ether, (alpha-cyclopentyl allyl) tolyl ether, beta-methallyl phenyl ether, beta-methallyl fluorophenyl ether, allyl acetate, allyl propionate, allyl butyrate, allyl isobutyrate, allyl valerate, allyl hexanoate, allyl cyclopentanoate, allyl cyclohexanoate, allyl benzoate, allyl methylbenzoate, allyl ethylbenzoate, beta-methallyl acetate, beta-methallyl propionate, beta-methallyl butyrate, beta-methallyl isobutyrate, beta-methallyl valerate, beta-methallyl hexanoate, beta-methallyl cyclopentanoate alpha-ethallyl acetate, alpha-methallyl isobutyrate, alpha-ethallyl benzoate, alpha-propallyl acetate, alpha-butallyl propionate, alpha-benzallyl acetate, alpha-phenallyl acetate, alpha-chloroethyl beta-methyl allyl acetate, alpha-cyclopentyl allyl acetate, vinyl chloroethyl ketone, vinyl bromoisobutyl ketone, alpha-iodocyclohexyl allyl alcohol, alpha-chlorobenzyl allyl alcohol, allyl bromoethyl ether, iodophenyl allyl ether, (alpha-chloropropyl allyl) acetate, etc.

In order that those skilled in the art may better understand the teachings of this invention, the following examples are given. All parts are by weight.

*Example 1*

| | Parts by weight |
|---|---|
| Divinyl benzene (260 parts of 23% sol'n. in diethyl benzene) | 60 |
| Allyl chloride | 60 |
| Benzoyl peroxide | 0.3 |

The above ingredients were refluxed for 4 hours and 10 minutes, during which time the reacting mixture increased immensely in viscosity. The solution was poured into methanol, causing the partial polymer to be precipitated. The product was triturated under methanol, dried and ground. The yield of polymer was 40 parts or 67%.

When placed in contact with a hot plate at 140° C. the polymer was easily fusible, indicating, therefore, that the product was a partial polymer.

*Example 2*

| | Parts by weight |
|---|---|
| Divinyl benzene (196 parts of 23% sol'n. in diethyl benzene) | 45 |
| Styrene | 5 |
| Allyl chloride | 45 |
| Benzoyl peroxide | 0.25 |

The above ingredients were heated at the boiling point of the reacting mixture for 55 minutes. The solution containing the partial polymer was poured into methanol. The product was triturated, dried and ground. When submitted to a hot plate test at 140° C., the partial polymer was easily fusible.

*Example 3*

| | Parts by weight |
|---|---|
| Divinyl benzene (260 parts of 23% sol'n. in diethyl benzene) | 60 |
| Allyl acetate | 60 |
| Benzoyl peroxide | 0.3 |

These were heated together at the boiling point of the reacting mass for 45 minutes. The partial polymer was precipitated by pouring into methanol, thoroughly triturated, dried and ground. As in the previous cases the resin was easily fusible at 140° C. The yield of product obtained was 70%.

*Example 4*

| | Parts by weight |
|---|---|
| Styrene | 2.5 |
| Divinyl benzene (206 parts of 23% sol'n. in diethyl benzene) | 47.5 |
| Allyl acetate | 47.5 |
| Benzoyl peroxide | 0.25 |

The above ingredients were refluxed for 35 minutes. The product was precipitated by pouring the viscous solution into methanol, thoroughly triturated and ground. The partial polymer flowed readily when placed on a hot plate at 140° C.

*Example 5*

| | Parts by weight |
|---|---|
| Divinyl benzene (260 parts of 23% sol'n. in diethyl benzene) | 60 |
| Allyl alcohol | 60 |
| Benzoyl peroxide | 0.3 |

The above ingredients were heated for 230 minutes at the boiling temperature of the reaction mixture. The polymer was precipitated by pouring into methanol, thoroughly triturated, dried and ground. The yield of partial polymer was 76.8% by weight. The product was easily fusible at elevated temperatures, e. g., 140° C.

Example 6

| | Parts by weight |
|---|---|
| Divinyl benzene (217 parts of 23% sol'n. in diethyl benzene) | 50 |
| Methallyl alcohol | 50 |
| Benzoyl peroxide | 0.25 |

The above ingredients were refluxed for 30 minutes, at the end of which time the viscous syrup was poured into methanol. The precipitated resin was triturated, dried and ground. The product was easily fusible on the hot plate at 140° C.

Example 7

| | Parts by weight |
|---|---|
| Styrene | 12.5 |
| Divinyl benzene (163 parts of 23% sol'n. in diethyl benzene) | 37.5 |
| Allyl alcohol | 37.5 |
| Benzoyl peroxide | 0.25 |

The above ingredients were heated at the reflux temperature for 40 minutes. The partial polymer was precipitated by pouring the viscous solution into methanol. The product was triturated, dried and ground. At the temperature of the hot plate, e. g., 140° C., the resin was easily fusible.

Example 8

| | Parts by weight |
|---|---|
| Styrene | 75 |
| Divinyl benzene (109 parts of 23% sol'n. in diethyl benzene) | 25 |
| Methallyl alcohol | 25 |
| Benzoyl peroxide | 0.5 |

The above ingredients were heated at the boiling temperature of the reacting mixture for 20 minutes. The partial polymer was precipitated by pouring the viscous solution into methanol. It was then triturated, dried and ground. The polymer was fusible at 140° C. on the hot plate.

Example 9

| | Parts by weight |
|---|---|
| Styrene | 80 |
| Divinyl benzene (43.5 parts of 23% sol'n. in diethyl benzene) | 10 |
| Methallyl alcohol | 10 |
| Benzoyl peroxide | 0.50 |

The above ingredients were heated at the reflux temperature of the reacting mixture for a period of 15 minutes. The partial polymer was separated from the solvent by pouring the viscous solution into methanol. The precipitated product was triturated, dried and ground. The usual fusibility was displayed on the hot plate at 140° C.

Example 10

The effect of the concentration of allyl chloride inhibitor was studied by measuring the gelation time during reflux, for various compositions of allyl chloride and divinyl benzene. The divinyl benzene was used in a solution of diethyl benzene containing 23% of the monomer.

| Parts of 23% solution | Divinyl benzene | Allyl chloride | Benzoyl peroxide | Gelation time |
|---|---|---|---|---|
| | Parts | Parts | Part | Minutes |
| 217 | 50.0 | | 0.5 | 17 |
| 108 | 25.0 | 2.5 | 0.25 | 45 |
| 81 | 18.7 | 6.25 | 0.25 | 55 |
| 53 | 12.5 | 12.5 | 0.25 | 195 |

From the above examples it can be seen that the allyl chloride has a very decided inhibiting effect which depends directly on the concentration of the halide.

Example 11

The above example was repeated using methacrolein as the inhibitor.

| Parts of 23% solution | Divinyl benzene | Meth-acrolein | Benzoyl peroxide | Gelation time |
|---|---|---|---|---|
| | Parts | Parts | Part | Minutes |
| 217 | 50.0 | | 0.5 | 17 |
| 108 | 25.0 | 2.5 | 0.25 | 35 |
| 81 | 18.7 | 6.25 | 0.25 | 65 |
| 53 | 12.5 | 12.5 | 0.25 | 210 |

As in the previous example increased concentrations of the inhibitor further retard the polymerization rate.

Example 12

Similar experiments to the above were carried out on allyl acetate.

| Parts of 23% solution | Divinyl benzene | Allyl acetate | Benzoyl peroxide | Gelation time |
|---|---|---|---|---|
| | Parts | Parts | Part | |
| 217 | 50.0 | | 0.5 | 17 minutes. |
| 217 | 50.0 | 5 | 0.5 | 30 minutes. |
| 108 | 25.0 | 25 | 0.25 | 60 minutes. |
| 108 | 25.0 | 75 | 0.5 | More than 12 hours. |

Example 13

The effect of concentration was also investigated, using allyl alcohol.

| Parts of 23% solution | Divinyl benzene | Allyl alcohol | Benzoyl peroxide | Gelation time |
|---|---|---|---|---|
| | Parts | Parts | Part | Minutes |
| 217 | 50.0 | | 0.5 | 17 |
| 196 | 45.0 | 5.0 | 0.5 | 40 |
| 163 | 37.5 | 12.5 | 0.5 | 50 |
| 108 | 25.0 | 25.0 | 0.5 | 180 |
| 53 | 12.5 | 37.5 | 0.5 | 510 |

Example 14

The partial polymers prepared in Examples 1, 3, 7, 8, 12 and 13 were found to possess equal solubilities. They were soluble in unsaturated monomers, e. g., ethyl acrylate, ethyl methacrylate, vinyl acetate, styrene, etc., in aromatic hydrocarbons, e. g., toluene, benzene, xylene and diethyl benzene, etc., in certain petroleum fractions, e. g., aromatic hydrocarbon oils and chlorinated products of these, etc.

In every case the precipitated partial polymer was fusible at 140° C. on the hot plate. However, continued exposure to this temperature resulted in a hard, thermoset, non-fusible mass.

Example 15

| | Parts by weight |
|---|---|
| Divinyl benzene (109 parts of 23% solution in diethyl benzene | 25 |
| Benzoyl peroxide | 0.25 |

The above were combined and then heated at the boiling temperature of the solution for a period of 10 minutes. At this point it appeared as though the polymer solution was near gelation. The viscous syrup was, therefore, poured into methanol and the precipitated partial polymer triturated, dried and ground. A yield of 64% was obtained. It is to be noted that due to the greater difficulty in this case of obtaining a partial polymer or avoiding gelation, the yield in this example was lower than that obtained in Examples 1, 3 and 7 where, due to the presence of an inhibitor, the time of reflux permissible before gelation was much longer.

What I claim as new and desire to secure by Letters Patent of the United States is:

1. The process which comprises, polymerizing a composition comprising a solution of divinyl benzene in a dialkyl benzene having at least two carbon atoms in each alkyl grouping, in the presence of both an inhibitor of and a catalyst for polymerization, for a period substantially less than required to cause gelation of the solution, and isolating the heat-convertible partially polymerized product, the inhibitor of polymerization being a compound of the formula

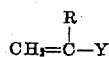

wherein R is a member of the class consisting of hydrogen and methyl and Y is a member of the class consisting of —CR'$_2$OR', —CR'$_2$X, —CR'$_2$OCOR', and —CR'O radicals wherein R' is a member of the class consisting of hydrogen and alkyl and aryl radicals and X is halogen.

2. The process which comprises polymerizing under heat divinyl benzene in a diethyl benzene solution in the presence of benzoyl peroxide and a compound of the formula

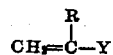

wherein R is a member of the class consisting of hydrogen and methyl and Y is a member of the class consisting of —CR'$_2$OR', —CR'$_2$X, —CR'$_2$OCOR', and —CR'O radicals wherein R' is a member of the class consisting of hydrogen and alkyl and aryl radicals and X is halogen, and isolating the heat-convertible partial polymer of divinyl benzene so produced.

3. The process which comprises polymerizing under heat a composition comprising divinyl benzene in a diethyl benzene solution, styrene, benzoyl peroxide and a compound of the formula

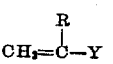

wherein R is a member of the class consisting of hydrogen and methyl and Y is a member of the class consisting of —CA'$_2$OR', —CR'$_2$X, —CR'$_2$OCOR', and —CR'O radicals wherein R' is a member of the class consisting of hydrogen and alkyl and aryl radicals and X is halogen, and isolating the heat-convertible partially copolymerized product so produced.

GAETANO F. D'ALELIO.

CERTIFICATE OF CORRECTION.

Patent No. 2,378,195. June 12, 1945.

GAETANO F. D'ALELIO.

It is hereby certified that error appears in the printed specification of the above numbered patent requiring correction as follows: Page 1, first column, line 15, for "dially" read --diallyl--; page 2, first column, line 51, for "ally" read --allyl--; line 61, for "cyclo" read -- cyclo- --; and line 67, for "alpha-ethallyl" read --alpha-methallyl--; page 3, second column, line 65, after "benzene" insert a closing parenthesis; page 4, second column, line 23, claim 3, for "-CA'$_2$OR'" read -- -CR'$_2$OR' --; and that the said Letters Patent should be read with this correction therein that the same may conform to the record of the case in the Patent Office.

Signed and sealed this 25th day of September, A. D. 1945.

Leslie Frazer (Seal)

First Assistant Commissioner of Patents.

to the greater difficulty in this case of obtaining a partial polymer or avoiding gelation, the yield in this example was lower than that obtained in Examples 1, 3 and 7 where, due to the presence of an inhibitor, the time of reflux permissible before gelation was much longer.

What I claim as new and desire to secure by Letters Patent of the United States is:

1. The process which comprises, polymerizing a composition comprising a solution of divinyl benzene in a dialkyl benzene having at least two carbon atoms in each alkyl grouping, in the presence of both an inhibitor of and a catalyst for polymerization, for a period substantially less than required to cause gelation of the solution, and isolating the heat-convertible partially polymerized product, the inhibitor of polymerization being a compound of the formula

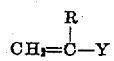

wherein R is a member of the class consisting of hydrogen and methyl and Y is a member of the class consisting of —CR'$_2$OR', —CR'$_2$X, —CR'$_2$OCOR', and —CR'O radicals wherein R' is a member of the class consisting of hydrogen and alkyl and aryl radicals and X is halogen.

2. The process which comprises polymerizing under heat divinyl benzene in a diethyl benzene solution in the presence of benzoyl peroxide and a compound of the formula

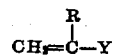

wherein R is a member of the class consisting of hydrogen and methyl and Y is a member of the class consisting of —CR'$_2$OR', —CR'$_2$X, —CR'$_2$OCOR', and —CR'O radicals wherein R' is a member of the class consisting of hydrogen and alkyl and aryl radicals and X is halogen, and isolating the heat-convertible partial polymer of divinyl benzene so produced.

3. The process which comprises polymerizing under heat a composition comprising divinyl benzene in a diethyl benzene solution, styrene, benzoyl peroxide and a compound of the formula

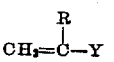

wherein R is a member of the class consisting of hydrogen and methyl and Y is a member of the class consisting of —CA'$_2$OR', —CR'$_2$X, —CR'$_2$OCOR', and —CR'O radicals wherein R' is a member of the class consisting of hydrogen and alkyl and aryl radicals and X is halogen, and isolating the heat-convertible partially copolymerized product so produced.

GAETANO F. D'ALELIO.

CERTIFICATE OF CORRECTION.

Patent No. 2,378,195. June 12, 1945.

GAETANO F. D'ALELIO.

It is hereby certified that error appears in the printed specification of the above numbered patent requiring correction as follows: Page 1, first column, line 15, for "dially" read --diallyl--; page 2, first column, line 51, for "ally" read --allyl--; line 61, for "cyclo" read -- cyclo- --; and line 67, for "alpha-ethallyl" read --alpha-methallyl--; page 3, second column, line 65, after "benzene" insert a closing parenthesis; page 4, second column, line 23, claim 3, for "-CA'$_2$OR'" read -- -CR'$_2$OR' --; and that the said Letters Patent should be read with this correction therein that the same may conform to the record of the case in the Patent Office.

Signed and sealed this 25th day of September, A. D. 1945.

Leslie Frazer (Seal) First Assistant Commissioner of Patents.